March 15, 1932.   R. G. McCURDY   1,849,193
SUBMARINE CABLE
Filed Aug. 16, 1929

INVENTOR
R. G. McCurdy
BY
ATTORNEY

Patented Mar. 15, 1932

1,849,193

UNITED STATES PATENT OFFICE

RALPH G. McCURDY, OF ENGLEWOOD, NEW JERSEY, ASSIGNOR TO AMERICAN TELEPHONE AND TELEGRAPH COMPANY, A CORPORATION OF NEW YORK

SUBMARINE CABLE

Application filed August 16, 1929. Serial No. 386,361.

This invention relates to submarine or other cables, and more particularly to a method and means for reducing the inductive disturbances from similar cables or from electric and magnetic fields from other sources.

For satisfactory signaling over cables, it is desirable to reduce disturbances from various sources to a minimum, the energy level of noise permissible being determined by the characteristics of the cable and the signal energy level. The theoretical minimum attainable is the disturbance due to thermal agitation of the particles constituting the cable conductor, which disturbance has been shown to depend on the resistance and on the temperature of the cable. Evidently, it should be the aim to approach as closely to such a condition as is permissible within the limits of knowledge and of commercial costs.

This invention gives a method and means by which the noise level due to such disturbances can be reduced to substantially the theoretical minimum.

In deep sea lengths of a submarine cable the sea water itself, taken with the cable armor, is a sufficient shield, so that if other cables are not adjacent the disturbances are down to this low level. In shallow water, however, where the cross-section of a body of sea water is relatively small, this is not true because of its low conductivity. This is a condition near the shore end of a cable, and if the entrance is into a harbor the conditions, due to narrowness of harbor entrances, are made more serious by the proximity of other cables and by electrical disturbances due to sundry other causes. My invention, therefore, is directed more particularly to methods and means for additional protection and shielding at the shore end of cables, and I make use of the discovery that the shielding effect of a homogeneous pipe covering is much greater than that of tape or wire armoring of similar material and equal weight per unit length. This is due to the avoidance of numerous air gaps, in the case of wire armoring, in the magnetic paths which are circumferential around the cable and the avoidance of the increase in resistance due to the longitudinal currents following a spiral path, as in the case of wire or tape armor.

Figure 1:
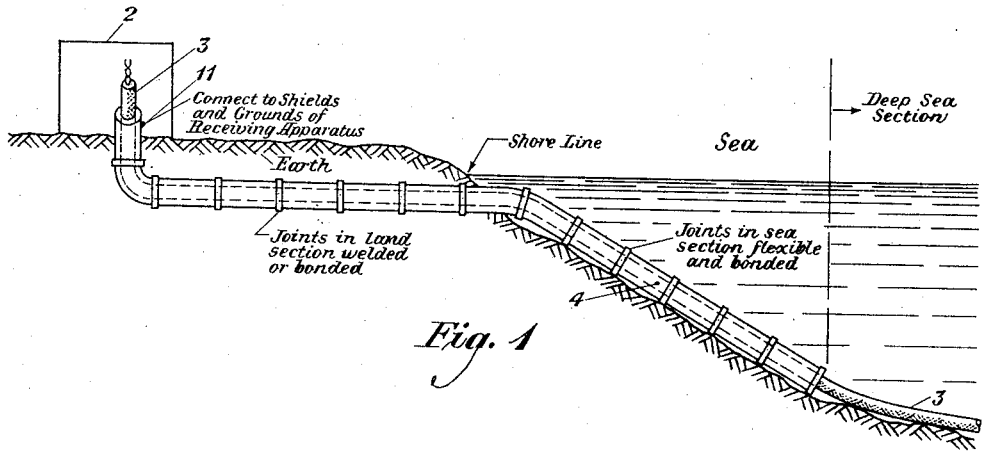
Figure 2:
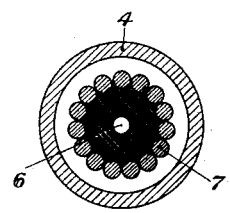
Figure 3:
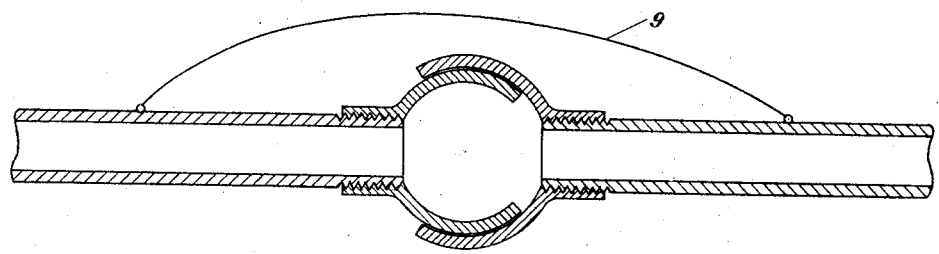

The invention will be better understood from the following specification, taken in connection with the accompanying drawings, in which Figure 1 shows the shore end of a submarine cable equipped with my special shielding means; Fig. 2 is a cross-section of the cable of Fig. 1 taken across a portion which is supplied with my special shield; and Fig. 3 shows a method for connecting sections of this shield.

Referring more particularly to Fig. 1, there is shown at 2 a cable terminal, the cable 3 extending out through shallow into deep water. It is understood that this cable will, in general, be of the usual form comprising an inner core of one or more or conductors supplied with armor of the usual type consisting of spirally wound wires, preferably of steel. In some cases, however, it may be that the shore end consists of a lead-sheathed cable spliced at some appropriate place to the armored section characteristic of the deep sea. Surrounding this cable there is shown a pipe 4 which, for convenience, is made up of sections threaded onto the cable at the time of laying or at the time of manufacture. This pipe may be of any suitable metal preferably of high conductivity and of high permeability, for reasons hereinafter set forth, and in the practice of my invention I find the ends sought are best served under present commercial costs by the use of iron pipe. It is not necessary or even desirable that this pipe covering should be water-tight, the presence of sea water between this covering and the armor of the cable having no harmful effects, but on the contrary may be somewhat beneficial. A cross-section of the cable under these conditions is shown in Fig. 2, in which 6 represents the core or primary conductor. Surrounding this, with suitable spacing of insulating material, is the armor 7 and surrounding the whole of this is the pipe 4.

While a continuous pipe would have certain advantages it would be extremely difficult to handle, both in manufacture and in the laying of the cable. For this reason I prefer to make this supplemental shield flexible, and this can most conveniently be attained by making the shield in sections of comparatively short length, the sections being connected one to another by any suitable flexible connection such, for instance, as a ball-and-socket joint, shown in Fig. 3. In this event it is evident that the socket of this joint might be made in two approximate hemispheres which, on assembly, may then be welded or bolted together or secured in any other appropriate manner. As will be pointed out hereinafter, it is desirable that the electrical resistance of this shield, considered longitudinally, shall be as low as feasible, and for this reason I provide a bond between the successive sections, as shown at 9 in Fig. 3.

It will be seen that when at rest the various parts will be so related that there will be numerous points of contact between the supplemental shield and the armor of the cable, and this is a desirable condition. In addition, however, at the receiving station special precautions should be taken to connect the supplemental shield and the armor together and to the ground connections of the receiving apparatus, as indicated at 11 in Fig. 1.

So markedly superior have I found the pipe shielding described above over the usual armor that the advantage amounts to as much as 50 decibels or more, and is effective in reducing the disturbances due to the shore end to approximately the level of those due to thermal agitation.

There are two conditions which it is desirable to fulfill in this supplemental shield. The one is that the pipe shall be of high permeability and the other that it shall be of high conductivity. While a copper pipe would be a good shield because of its high conductivity, I find iron to be preferable for the high permeability more than compensates for the lower conductivity.

The reason for desiring reasonably high conductivity is that the magnitude of the disturbing effects in the instruments connected, as they will be, between cable and armor, will be proportional to the IR drop along the shield, and this will be the smaller as R is reduced. It is for this reason that I find it desirable to establish a good bonding between the sections of the pipe, as described in connection with Fig. 3.

The reason for desiring high permeability is that the induced E. M. F. from external sources will be the same for both the core and the shield. If the shield is of high permeability the impedance will be relatively high for the core path but will be low for the shield when the disturbing currents confine themselves, as they will, chiefly to the outer portion of the shield. This latter is apparent, for it is well known that a cylindrical sheet of current produces no magnetic field within that sheet, and thus the material comprising this shield will not be subject to a magnetizing force, and such currents will find a path of low impedance. On the other hand, currents, flowing through the core will set up a magnetic field, magnetizing the material of the shield, and thus will find a path of relatively high impedance. The core will therefore be largely free from currents due to external disturbing sources. Another appropriate way of viewing this is to recognize that when a desired signal current is passing over the core, the so-called return current tends to take the path which offers the least impedance. This path becomes more and more markedly the inner surface of the shield as the permeability of the shield rises, and thus the magnetic field due to the signal current is more completely confined to the space between the shield and the core. This, however, means a lowering of the mutual coupling between the cable and outside sources, so that not only are the effects of the cable on other cables and apparatus reduced, but the effects of these other cables and sources on the cable in question are reduced.

While the specification thus far has implied that the conductor at the center of the cable is a single conductor it is to be understood that it may consist of two or more conductors as indicated in Fig. 1 and that these conductors may be used separately or in parallel or in any desired combination.

What is claimed is:

1. In a cable comprising a conductor and an armor, means for so shielding the cable that external interference will be reduced to a noise level of the order of that due to thermal agitation, said means comprising a homogeneous shield of conductive and magnetic material forming a substantially continuous magnetic path of low reluctance circumferentially and providing a continuous and uninterrupted electrical path for currents flowing in a substantially rectilinear direction parallel to the conductor.

2. In a cable comprising a conductor and an armor, means for so shielding the cable that external interference will be reduced to a noise level of the order of that due to thermal agitation, said means comprising a homogeneous shield of conductive and magnetic material forming a substantially continuous magnetic path of low reluctance circumferentially, said shield being formed in longitudinal sections, and means for bridging said sections electrically to form an uninterrupted path for current flowing in a substantially rectilinear direction parallel to the conductor.

3. In a cable comprising a conductor and an armor, means for reducing the effect of external disturbances to a noise level of the order of resistance noise in the conductor itself, which comprises a metal shield in the form of sections of pipe surrounding said cable, the sections being flexibly joined and electrically bonded.

4. In a cable comprising a conductor and an armor, means for reducing the effect of external disturbances to a noise level of the order of resistance noise in the conductor itself, which comprises a metal shield in the form of sections of pipe surrounding said cable, the sections being flexibly joined and electrically bonded, the circumferential path being of low magnetic reluctance.

5. In a cable, means for so shielding the cable that external interference therein will be reduced to a point at least as low as the noise due to thermal agitation in the cable, said means comprising a series of sections of iron pipe surrounding the conductor and mechanically joined end to end with electrical bonds joining the sections to render the series of sections conductive in a substantially rectilinear direction parallel to the conductor.

6. In a cable, means for so shielding the cable that external interference therein will be reduced to substantially the same magnitude as the noise due to thermal agitation in the cable, said means comprising a series of sections of iron pipe surrounding the conductor and provided with flexible joints at their ends and being electrically bonded at the joints so as to render the series of sections of pipe conductive in a substantially rectilinear direction parallel to the conductor.

In testimony whereof, I have signed my name to this specification this 15th day of August, 1929.

RALPH G. McCURDY.